United States Patent
Morin et al.

(10) Patent No.: US 7,520,249 B2
(45) Date of Patent: Apr. 21, 2009

(54) CIRCULATING FLUIDIZED BED REACTOR WITH A CONVERTIBLE COMBUSTION METHOD

(75) Inventors: Jean-Xavier Morin, Neuville Aux Bois (FR); Corinne Beal, Voisins le Bretonneux (FR); Silvestre Suraniti, Aix En Provence (FR); Emmanuel Flores, Saint Quentin sur Isere (FR); Daniel Baglione, Gentilly (FR)

(73) Assignee: ALSTOM Technology Ltd, Baden (CH)

( * ) Notice: Subject to any disclaimer, the term of this patent is extended or adjusted under 35 U.S.C. 154(b) by 133 days.

(21) Appl. No.: 11/541,271

(22) Filed: Sep. 29, 2006

(65) Prior Publication Data

US 2007/0079773 A1   Apr. 12, 2007

(30) Foreign Application Priority Data

Oct. 7, 2005   (FR)   ................ 05 53050

(51) Int. Cl.
*F23C 10/02* (2006.01)
(52) U.S. Cl. .................. 122/4 D; 432/58; 110/245; 165/104.16
(58) Field of Classification Search ........... 122/4 D; 432/58, 106; 165/104.15, 104.16; 110/244, 110/245
See application file for complete search history.

(56) References Cited

U.S. PATENT DOCUMENTS

| | | | | |
|---|---|---|---|---|
| 3,893,426 A | * | 7/1975 | Bryers | 122/4 D |
| 4,542,115 A | * | 9/1985 | Strack et al. | 502/64 |
| 4,761,131 A | * | 8/1988 | Abdulally | 431/7 |
| 5,181,481 A | * | 1/1993 | Dietz | 122/4 D |
| 6,505,567 B1 | | 1/2003 | Anderson et al. | |
| 6,938,780 B2 | * | 9/2005 | Baglione et al. | 209/717 |
| 2001/0025702 A1 | * | 10/2001 | Hyppanen | 165/96 |
| 2004/0065273 A1 | * | 4/2004 | Baglione et al. | 122/4 D |
| 2008/0000403 A1 | * | 1/2008 | Morin et al. | 110/245 |

FOREIGN PATENT DOCUMENTS

| | | | | |
|---|---|---|---|---|
| WO | WO 03/038338 | | 5/2003 | |
| WO | WO 2004/036118 | | 4/2004 | |
| WO | WO 2004036118 A2 | * | 4/2004 | 122/4 D |

* cited by examiner

*Primary Examiner*—Gregory A Wilson
(74) *Attorney, Agent, or Firm*—Robert D. Crawford (57) ABSTRACT

A circulating fluidized bed reactor is provided that includes a reaction chamber having a vertical partition wall forming two independent subchambers that include a combustion subchamber and a cooling subchamber. A combustion fluidizing gas is provided to the combustion subchamber to maintain a circulating fluidized bed therein. At least one centrifugal separator receives flue gas from the combustion subchamber and separates particles from the flue gas. At least one external bed receives the particles from the at least one centrifugal separator and provides the particles to the combustion subchamber. An external bed fluidizing gas is provided to the external bed to fluidize the particles therein. The cooling subchamber cools the external bed fluidizing gas received from the external bed. A heat exchanger cage receives the flue gas from the centrifugal separator and the external bed fluidizing gas from the cooling subchamber.

15 Claims, 10 Drawing Sheets

CIRCULATING FLUIDIZED BED REACTOR WITH A CONVERTIBLE COMBUSTION METHOD

BACKGROUND OF THE INVENTION

The present invention relates to a circulating fluidized bed reactor and a convertible combustion method applicable thereto.

The development of new regulations limiting greenhouse gas emissions, including carbon dioxide in fossil fuel power plants, is leading to the implementation of technologies for capturing the carbon dioxide present in the flue gases that are produced as a result of the combustion of fuel in the presence of air.

The technology frequently used to capture carbon dioxide consists of scrubbing the flue gases that have been diluted with nitrogen from the air employed for combustion purposes using solvents, which absorb the carbon dioxide and then restore the carbon dioxide as a concentrated carbon dioxide gas stream after the solvent has been regenerated by the heating thereof.

Such technology for its implementation consumes considerable energy and substantially decreases the efficiency of the fossil fuel power plants where such technology is utilizes, that is, decreases the efficiency of such fossil fuel power plants by more than fifteen percentage points.

U.S. Pat. Nos. 4,498,289 and 5,175,995 teach the use of oxygen as an oxidizer instead of air in boilers wherein steam is produced.

The advantage of using oxygen rather than air as an oxidizer is the reduction, going as far as the complete removal thereof, of the nitrogen, which is employed for purposes of diluting the carbon dioxide present in the flue gases and which originates from the nitrogen present in the air employed for combustion purposes as well as the substantial reduction in the size of the equipment required for such a purpose, thereby resulting in a flue gas flow rate that is approximately 35%-40% of the typical flue gas flow rate when air is employed for combustion purposes.

The application of this principle to a circulating fluidized bed boiler is disclosed in patent U.S. Pat. No. 6,505,567. According to the teachings of this document, a steam generator having a fluidized bed furnace includes means for introducing substantially pure oxygen into said steam generator.

The advantage of such a circulating fluidized bed technique is alleged to be that it permits the extraction of the heat in the circulating solids loop and the maintenance of a low combustion temperature, independently of the oxygen content of the oxidizer that is being utilized for combustion purposes. Hence such a technique is particularly attractive and serves to maximize the amount of oxygen in the oxidizer that is being utilized for combustion purposes, while at the same time minimizing the size of the circulating fluidized bed boiler, the size thereof being dependent directly on the flow rate of the flue gases that are produced during combustion.

However, according to this prior art, there are no teachings of any means that would be capable of being employed for purposes of effectively converting a circulating fluidized bed reactor, which is designed to utilize air for combustion purposes into a circulating fluidized bed reactor that is capable of utilizing oxygen for combustion purposes.

SUMMARY OF THE INVENTION

It is an object of the present invention to provide a circulating fluidized bed reactor, which has been designed specifically to operate with air being employed for combustion purposes and, with a minimum of structural modifications, permitting the conversion thereof into a circulating fluidized bed reactor that can effectively be operated with oxygen and recycled carbon dioxide being employed for combustion purposes.

For this purpose, the present invention proposes that a circulating fluidized bed reactor, which has been designed to be supplied with air to be used for combustion purposes, is capable of being converted to operate such that an oxygen-rich mixture is capable of being employed therein for combustion purpose. In accordance with the present invention, such a circulating fluidized bed reactor comprises a reaction chamber horizontally bounded by vertical walls, at least two centrifugal separators and a heat recovery element referred to hereinafter as a heat exchanger cage. Continuing such a circulating fluidized bed reactor also comprises means for introducing a fluidization gas into the reaction chamber thereof using at least one wind box located under the reaction chamber for purposes of maintaining a circulating fluidized bed of particles in said reaction chamber, means for transferring gas that must be dedusted from the reaction chamber to the separators, means for discharging the particles separated from the separators and means for transferring the dust-free gases from the separators to the heat exchanger cage. Thus, a circulating fluidized bed reactor is provided that is characterized in that said reaction chamber comprises at least one partially internal vertical partition wall forming two subchambers communicating together and each communicating with at least one separator, and said heat exchanger cage comprises a partially internal vertical partition wall forming two subcages communicating together and each communicating together with at least one separator, such that these partition walls are arranged in order to create a passage for the flow of the flue gases into one of said subchambers and into one of said subcages when the operation involves the feed of oxygen into the reaction chamber.

According to a preferred embodiment of the present invention, the cross-section of one of said subchambers is between 60 and 65% of the total cross section of said reaction chamber, the cross-section of the other subchamber being between 35 and 40% of the total cross-section of said reaction chamber, and with said oxygen-rich mixture being comprised of 70% of oxygen and 30% of recycled carbon dioxide.

Preferably, said wind box is divided into two sub-boxes by a wall placed in the same plane as said partition wall of the reaction chamber.

In the case in which the circulating fluidized bed reactor of the present invention also comprises at least two external beds, and each of them is designed to receive the particles leaving each separator via a solid particle fed channel and each of them is comprised of a wall which may be common with said reaction chamber. Additionally, a siphon arrangement is advantageously placed at least partially inside said reaction chamber along the length of said partition wall thereof, which may be common with said external beds and with said reaction chamber.

Preferably, the open area of said external beds are oversized in order to provide a free space for adding 10 to 20% of heat exchanger area.

The fuel feed lines are preferably oversized.

According to one exemplary embodiment of the present invention, the circulating fluidized bed reactor comprises a reaction chamber horizontally bounded by vertical walls, two centrifugal separators and a heat exchanger cage located behind the reaction chamber, and with the two separators being lateral and each having a common vertical wall with the side walls of the heat exchanger cage and the partition wall of the reaction chamber extending perpendicular to the front wall of the reaction chamber and with the partition wall of the heat exchanger cage extending parallel to the partition wall of the reaction chamber.

According to another exemplary embodiment of the present invention, the circulating fluidized bed reactor comprises a reaction chamber horizontally bounded by vertical walls, n centrifugal separators provided with flue gas outlet ducts operative for connecting each pair of separators to a rear heat exchanger cage and a heat exchanger cage located behind the reaction chamber, n being greater than or equal to 2, and wherein the reaction chamber's vertical side walls may be common with a vertical side wall of a set of n/2 separators, and wherein the partition wall of the reaction chamber is parallel to the front wall of the reaction chamber and the partition wall of the heat exchanger cage is parallel to the partition wall of the reaction chamber.

In the embodiment that is described above, preferably, the two flue gas outlet ducts, which connect each set of separators to the rear exchanger cage, are equipped with a vertically and parallelly extending partition wall.

The present invention further encompasses a method for converting a circulating fluidized bed reactor as indicated above, in order to permit such a circulating fluidized bed reactor's operation with a combination of both oxygen and recycled carbon dioxide. Such a method is characterized in that said method comprises the following conversion steps:

complete and sealed closure of the vertical partition wall of the reaction chamber to form two independent subchambers, one of which, being referred to as the combustion subchamber, is designed to function as a combustion chamber to which oxygen is supplied, and the other of which, being referred to as the cooling subchamber, is designed to be operative to cool the fluidization gases of the external beds, and complete and sealed closure of the vertical partition wall of the heat exchanger cage to form two independent subcages.

According to a preferred embodiment of this method of the present invention, such a method also comprises the following conversion steps:

disabling of the solid particle feed to the corresponding separator or separators, or disabling of the external bed(s) connected to the cooling subchamber, and blocking of the passage between the external bed(s) and the cooling subchamber, and on each side of the reaction chamber, connections are made in series of the solid particle feed channels of all the existing external beds, and the feed from one of the external bed(s) is connected to the combustion subchamber, and equipping all of these connections with control valves.

Advantageously, the method in accordance with the present invention further includes a step of installing a siphon arrangement so as to be located at least partially inside the reaction chamber along the length of the partition wall thereof, which may be common with the external beds and with the reaction chamber.

Preferably, the method of the present invention comprises the following conversion steps:

blocking of the outlet openings of the siphon arrangement inside the cooling subchamber, and forming openings in the ceiling and/or the walls of the siphon arrangement inside the cooling subchamber, and fluidizing the siphon arrangement in order to thereby ensure a longitudinal transfer of the solids present in this siphon arrangement.

The method of the present invention may also include the step of blocking all of the fuel and secondary air feeds to the cooling subchamber.

The present invention also encompasses a circulating fluidized bed reactor, which is designed to be fed with an oxygen-rich mixture, and which is capable of being converted in accordance with the method that has been described above.

BRIEF DESCRIPTION OF THE DRAWINGS

The present invention is described below in greater detail with reference to Figures of the Drawing wherein preferred embodiments of the present invention are illustrated.

DETAILED DESCRIPTION OF THE PREFERRED EMBODIMENT

According to the first embodiment of the circulating fluidized bed reactor of the present invention as described herein and as illustrated in FIGS. 1 to 8 of the Drawings, the circulating fluidized bed reactor is of the type similar to that which is described and illustrated in patent document WO 03/038338 that has been filed by the same Assignee as the present patent application.

Figure 1:
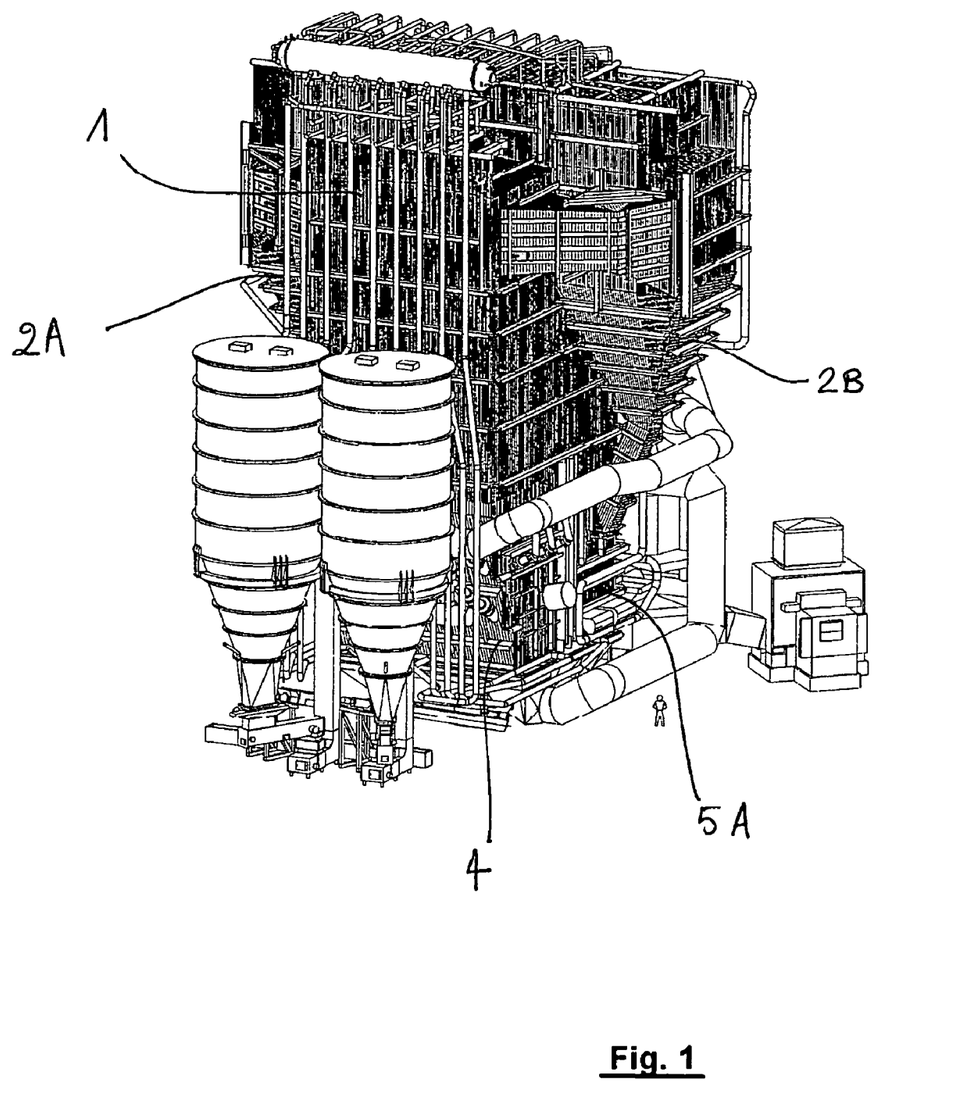
FIGS. 1 and 2 are perspective views of a first embodiment of a circulating fluidized bed reactor constructed in accordance with the present invention.
Figure 2:
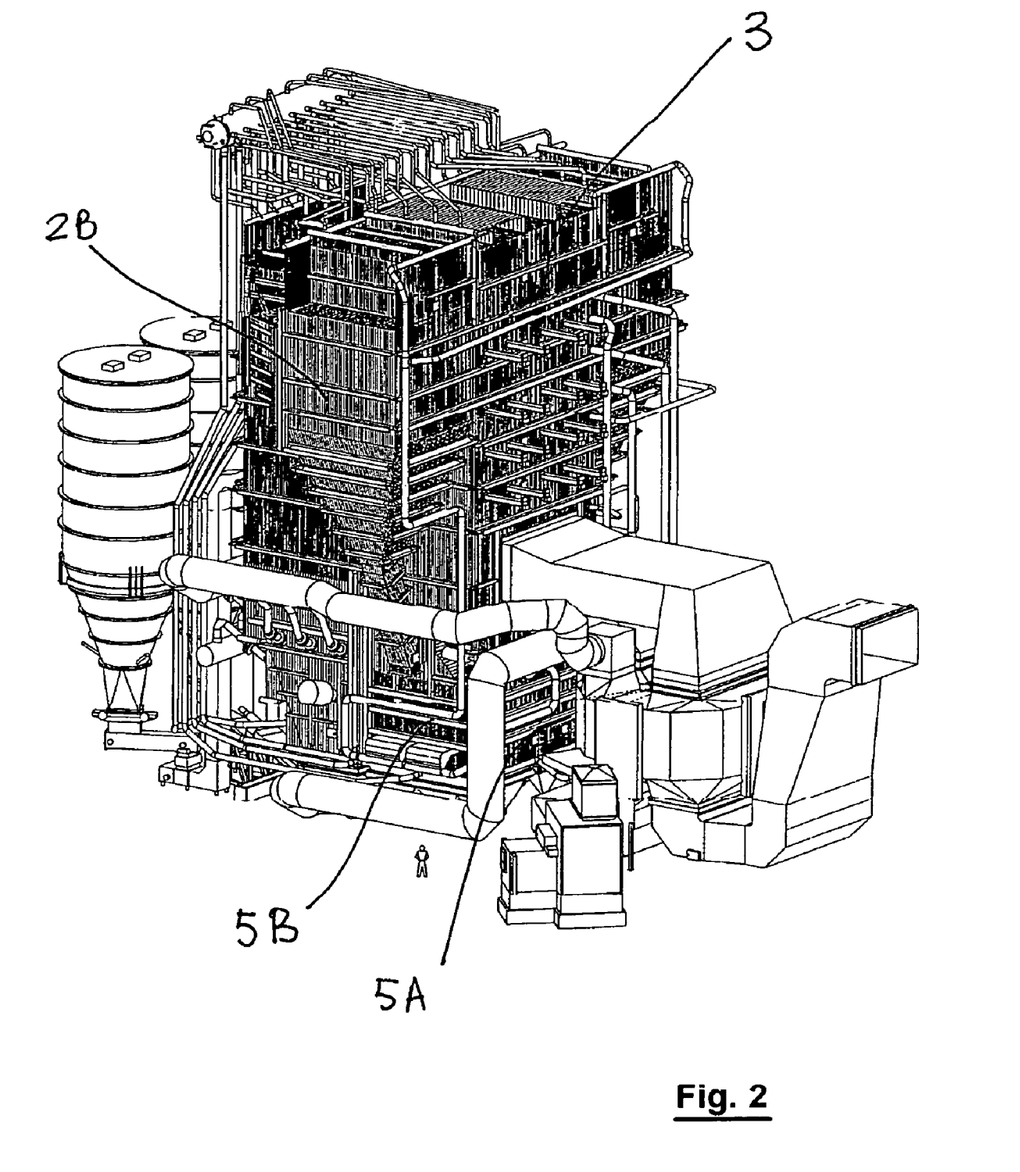

To this end, this circulating fluidized bed reactor comprises a reaction chamber 1 horizontally bounded by vertical walls, two centrifugal separators 2A and 2B and a heat recovery element referred to herein as a heat exchanger cage 3, which is located behind the reaction chamber 1. This circulating fluidized bed reactor further comprises means for introducing a fluidization gas into the reaction chamber 1 for purposes of maintaining a circulating fluidized bed of particles in this reaction chamber 1. A wind box 4 located under the reaction chamber 1 is utilized for this purpose. This circulating fluidized bed reactor also comprises means for transferring from the reaction chamber 1 to the separators 2A, 2B the gas, which must be dedusted, means for discharging the particles separated from the gas in the separators 2A and 2B, and means for transferring the dust-free gases from the separators 2A and 2B to the heat exchanger cage 3. This circulating fluidized bed reactor also comprises two external beds 5A and 5B, each of which is designed to receive via a solid particle feed channel the particles leaving each of the separators 2A and 2B. Each of the external beds 5A and 5B has a wall, which is common to the reaction chamber 1 as well.

The two separators 2A, 2B extend laterally, and they each have a vertical wall, which is common with the side wall of the heat exchanger cage 3.

According to this first embodiment of the present invention, this circulating fluidized bed reactor is designed to be supplied with air that is to be used for combustion purposes, but is also capable of being converted in order to be able to operate when supplied with an oxygen-rich mixture for combustion purposes, in an efficient manner and with a minimum number of conversion operations being required in order to achieve this result.

Preferably, such an oxygen-rich mixture consists of 70% oxygen and 30% recycled carbon dioxide.

Figure 3:
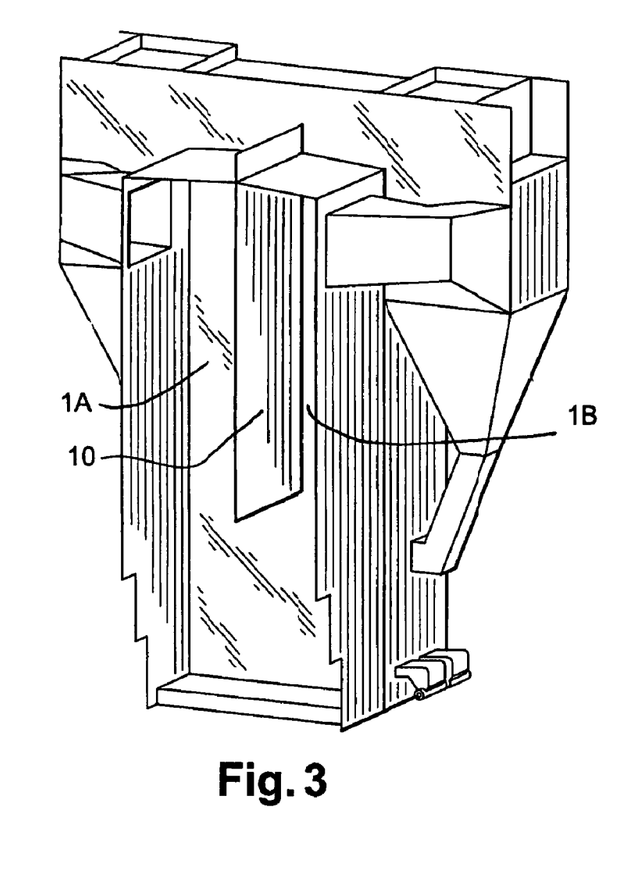
FIGS. 3 and 4 are perspective views of a first embodiment of a circulating fluidized bed reactor constructed in accordance with the present invention, wherein the reaction chamber thereof and the heat exchanger cage thereof are illustrated as being opened in order to thereby provide an interior view thereof.
Figure 4:
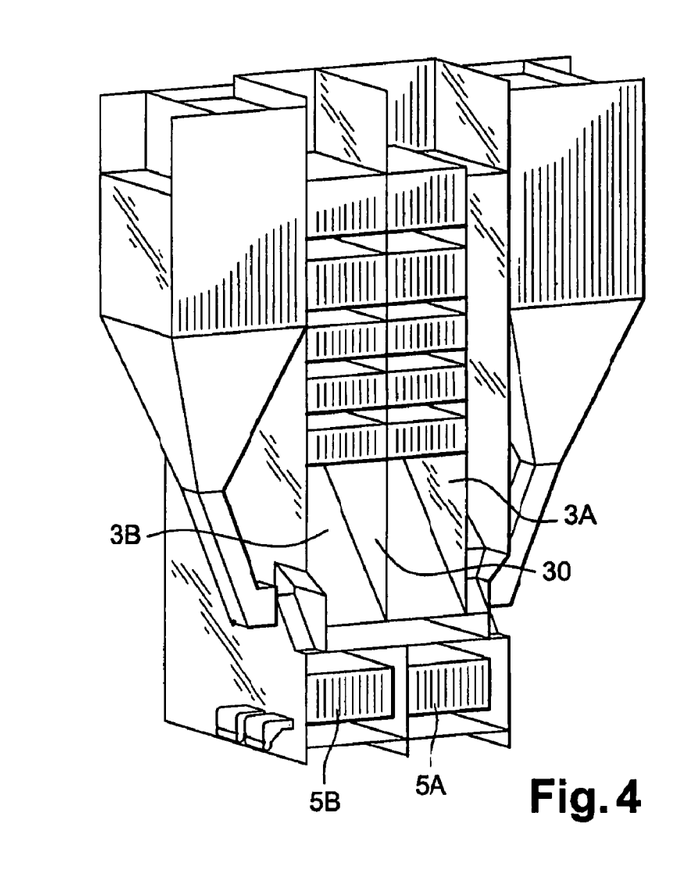
Figure 5A:
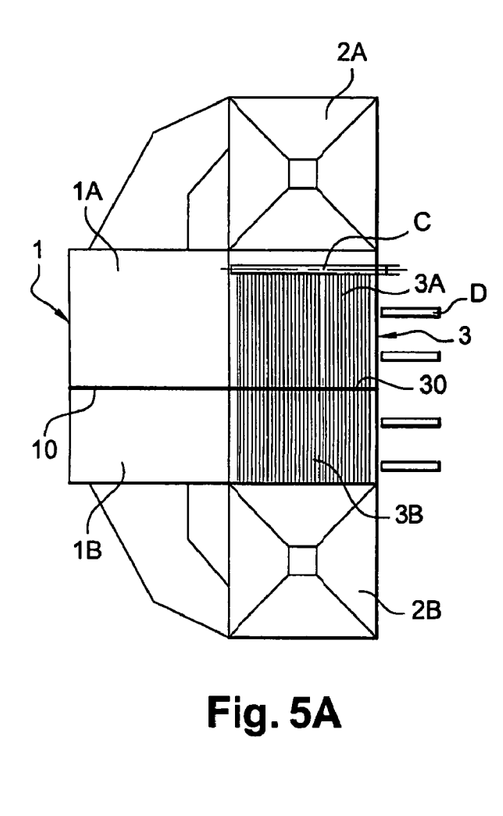
FIGS. 5A to 5C are horizontal cross-sections of the upper portion of a first embodiment of a circulating fluidized bed reactor constructed in accordance with the present invention.
Figure 5B:
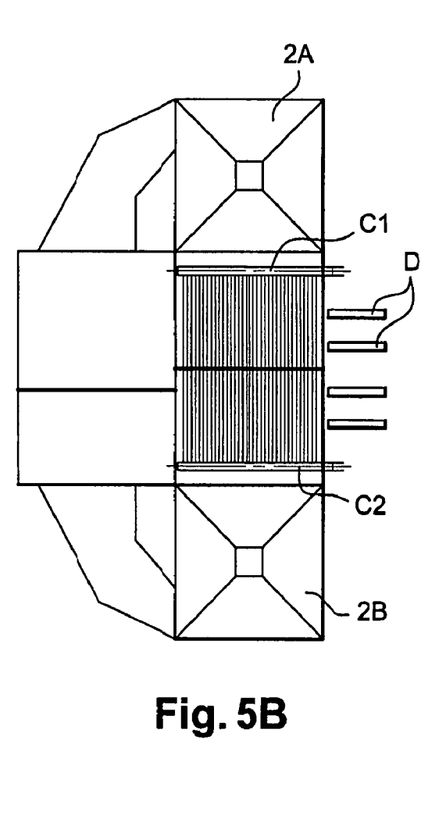
Figure 5C:
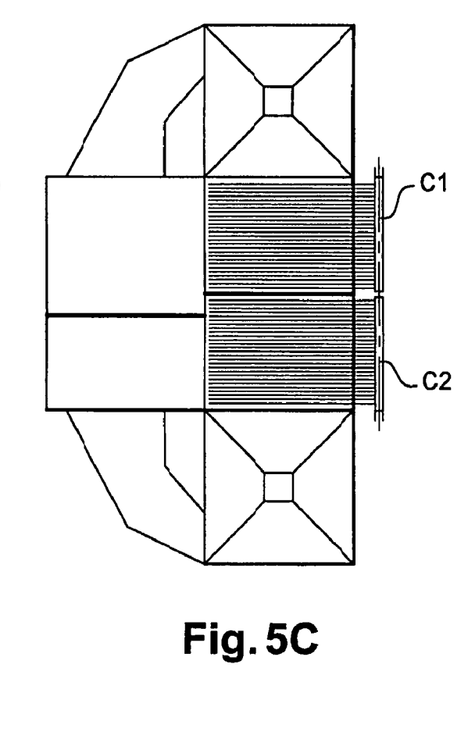

Continuing, as illustrated in FIGS. 3 to 5 of the Drawings, the reaction chamber 1 comprises a partial internal vertical partition wall 10 that functions to divide the reaction chamber 1 into two subchambers 1A and 1B, which communicate with one another and with each also in communication with one of the separators 2A and 2B. The heat exchanger cage 3 comprises a partial internal vertical partition wall 30 that functions to divide the heat exchanger cage 3 into two subcages 3A, 3B, which communicate with one another and with each also in communication with at least one of the separators 2A and 2B.

The partition wall 10 of the reaction chamber 1 extends perpendicularly to the front wall of the reaction chamber 1 and the partition wall 30 of the heat exchanger cage 3 extends parallel to the partition wall 10 of the reaction chamber 1.

Generally speaking, these partition walls 10, 30 are arranged in such a manner as to define a cross-section of one of the subchambers, that is, subchamber 1B and one of the subcages, that is, subcage 3B in accordance with when the combustion is being conducted with an oxygen feed to the reaction chamber 1. Advantageously, the cross-section of one of said subchambers, that is, subchamber 1A is between 60 and 65% of the total cross-section of the reaction chamber 1, while the cross-section of the other subchamber, that is, subchamber 1B is between 35 and 40%.

The partition walls 10, 30, as shown in the Figures of the Drawings, extend from the ceiling to the bottom of the reaction chamber 1 and the heat exchanger cage 3, respectively, and provide for the existence of a free passage in the bottom of the reaction chamber 1 and/or the heat exchanger cage 3, respectively. As a variant thereto, the partition walls 10 and 30 may provide for the existence of a free passage in the upper portion of the reaction chamber 1 and/or of the heat exchanger cage 3 or the partition walls 10 and 30 may take the form of walls wherein several openings are provided therein, with such openings being distributed or not along their height and being located or not along their entire width.

In the heat exchanger cage 3, the exchangers may be arranged parallel to the front wall of the reaction chamber 1 so that the exchangers pass through the partition wall 30 of the heat exchanger cage 3 in a sealed manner, as shown in FIG. 5A of the Drawings. A single row of collectors C is then necessary, with the collectors C being arranged on a side edge of the heat exchanger cage 3 along with steam dedusting apparatus (cleaners) D for cleaning the two subcages 3A and 3B and the exchangers.

The exchangers may also be arranged parallel to the front wall of the reaction chamber 1 so that they do not pass through the partition wall 30 of the heat exchanger cage 3, as shown in FIG. 5B of the Drawings. Two rows of collectors C1, C2 are then necessary, with each being located on one side edge of the heat exchanger cage 3 along with steam dedusting apparatus (cleaners) D for the cleaning of the two subcages 3A and 3B and the exchangers.

The exchangers may also be arranged perpendicular to the front wall of the reaction chamber 1, as shown in FIG. 5C of the Drawings. Two rows of collectors C are then necessary, with the collectors C being arranged behind the heat exchanger cage 3 along with the steam or infrasonic dedusting apparatus (cleaners), according to the spacing between the exchangers, for purposes of effecting therewith the cleaning of the two subcages 3A and 3B and the exchangers.

Figure 6:
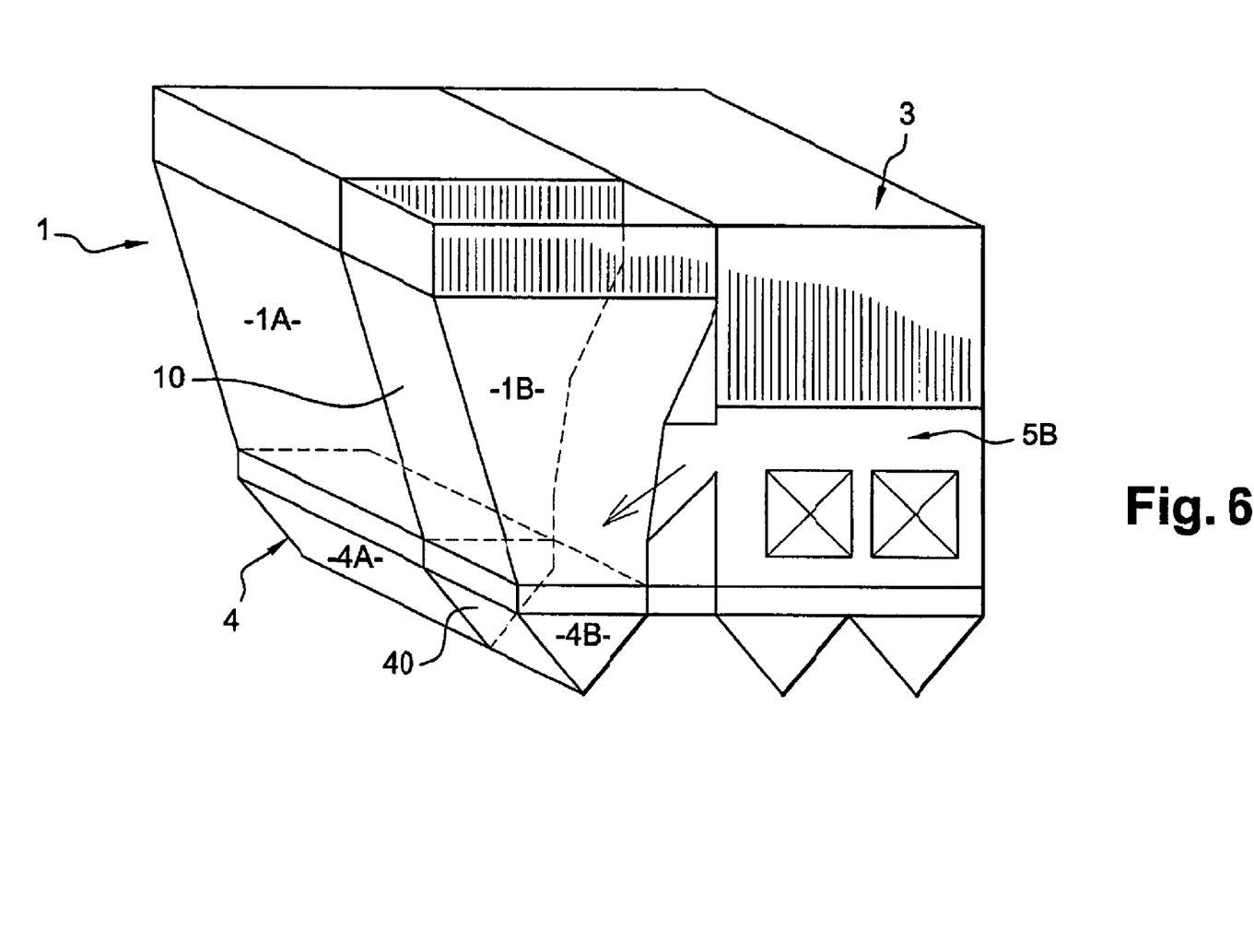
FIG. 6 is a schematic and partial perspective view of a first embodiment of a circulating fluidized bed reactor constructed in accordance with the present invention.

The wind box 4, clearly visible in FIG. 6 of the Drawings, is divided into two sub-boxes 4A, 4B by a wall 40, which is located in the same vertical plane as the partition wall 10 of the reaction chamber 1.

As a variant thereto, it may suffice for the wind box 4 to be pre-equipped for subsequent segmentation during the conversion of the circulating fluidized bed reactor.

Figure 7A:
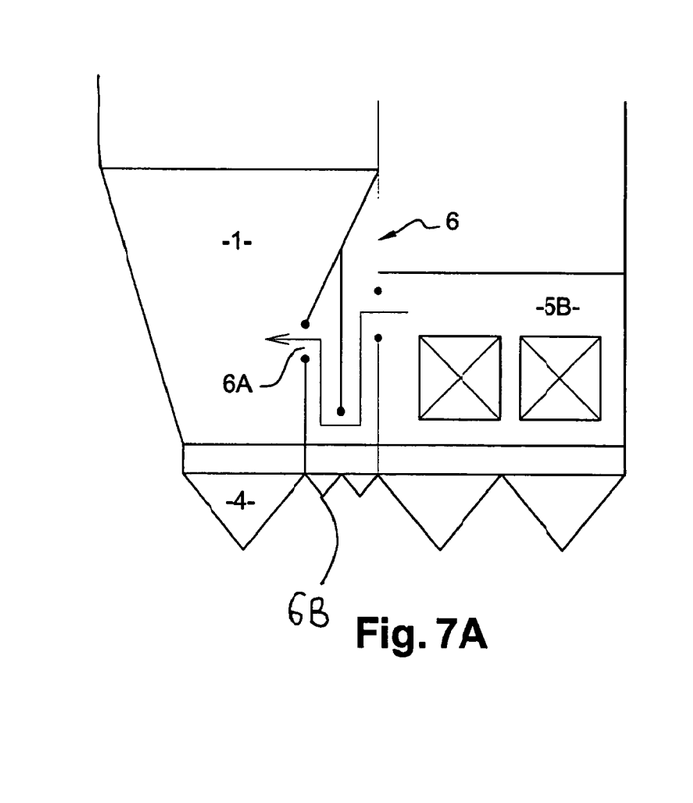
FIGS. 7A and 7B are vertical and horizontal cross-sections of a first embodiment of a circulating fluidized bed reactor constructed in accordance with the present invention.
Figure 7B:
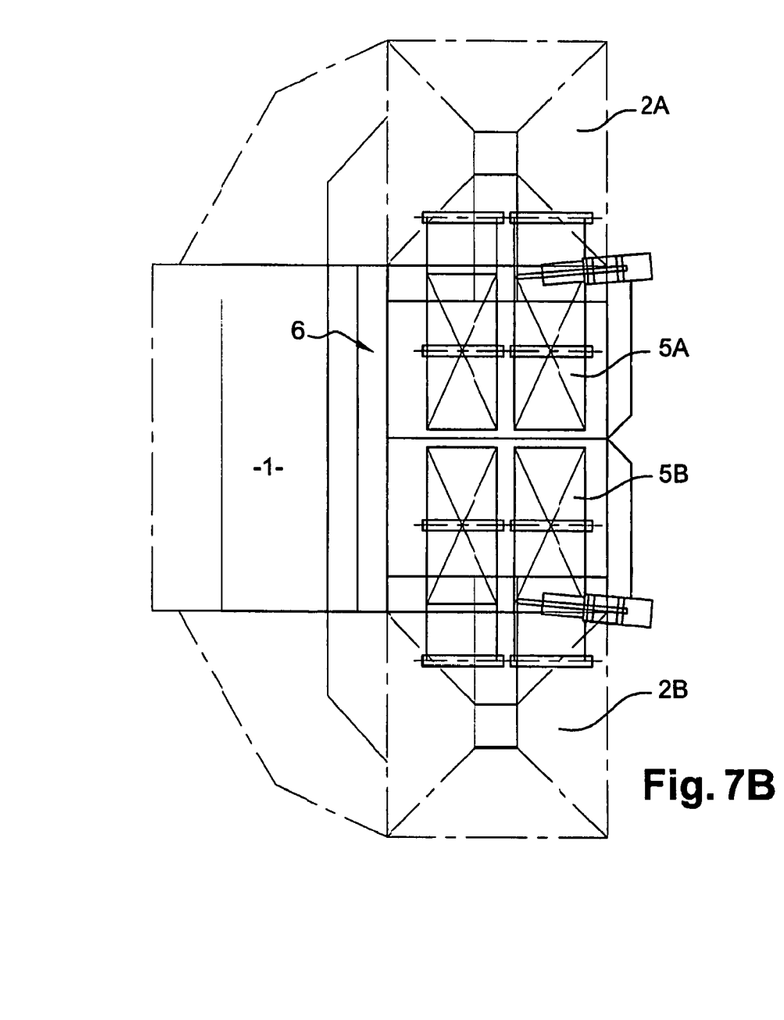

As shown in FIGS. 7A and 7B of the Drawings, a siphon arrangement 6 is located inside the reaction chamber 1 along the length of the wall that is common with the external beds 5A, 5B and the reaction chamber 1. In unconverted operation, that is, when air is being employed for combustion purposes, the siphon arrangement 6 does not have any specific function to perform other than to provide for the passage of the solids from the external beds 5A and 5B to the reaction chamber 1 via the outlet openings 6A that are arranged along the entire width of the reaction chamber 1. However, the siphon arrangement 6 may also be installed without departing from the essence of the present invention during assembly of the reactor chamber 1, when the reaction chamber 1 is being operated with air being employed for purposes of combustion, in order to decrease and simplify the changes that need to be made in order to effect the conversion of the circulating fluidized bed reactor from operation with air for combustion purposes to oxygen for combustion purposes.

As a variant thereto, this siphon arrangement 6 may also be installed subsequently without departing from the essence of the present invention during the conversion of the circulating fluidized bed reactor from firing with air to firing with oxygen.

Figure 8A:
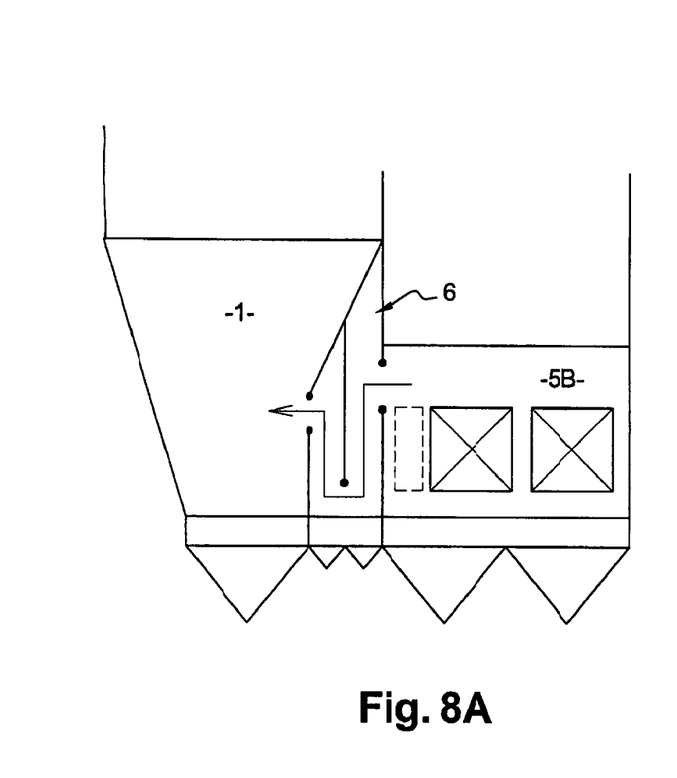
FIGS. 8A and 8B are also vertical and horizontal cross-sections of a first embodiment of a circulating fluidized bed reactor constructed in accordance with the present invention.
Figure 8B:
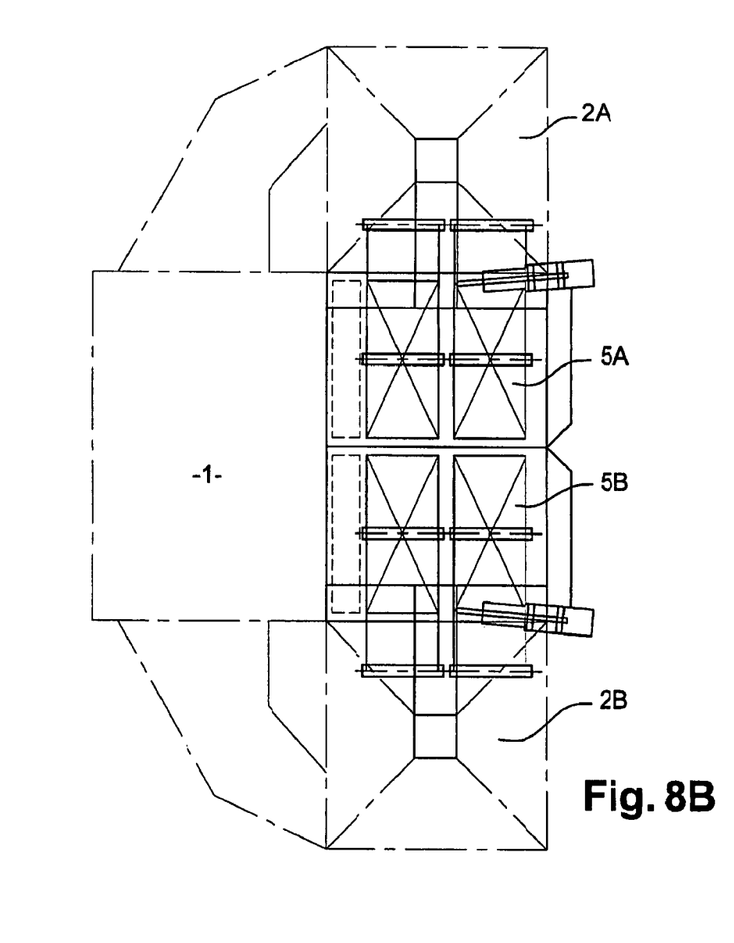

As shown in FIGS. 8A and 8B of the Drawings, the open areas of the external beds 5A, 5B are oversized in their length, in order to thereby provide free space. As will be described more fully hereinafter, the vaporization and/or superheat exchangers will in fact need to be added to the external beds 5A and 5B for purposes of the conversion of the circulating fluidized bed reactor to enable oxygen and recycled carbon dioxide to be employed for combustion purposes.

Furthermore, the fuel feed lines are oversized to permit the full passage of the fuel into the subchamber 1B after such conversion to oxygen and recycled carbon dioxide firing. The same is also true for the fuel transport apparatus, which must allow for a total injected flow rate into the subchamber 1B after such conversion to oxygen and recycled carbon dioxide firing.

The circulating fluidized bed reactor as previously described herein is designed to be operated when air is being employed for combustion purposes. Due to a number of changes, which will now be described, such a circulating fluidized bed reactor is capable of being converted to operate with oxygen and recycled carbon dioxide being utilized for combustion purposes. The general principles upon which this conversion is based are to use a single subchamber of the reaction chamber as a firebox or combustion chamber, to use the separator connected to said reaction chamber for the separator's primary function of separating gases and solids, to recover the gases leaving said separator in a subcage of the exchanger cage, to recover the solids leaving said separator in the two external beds connected for the parallel flow of the solids and connected at the outlet of said combustion chamber for transferring the solids, and connected at the outlet of the other subchamber, referred to herein as the cooling chamber, for transferring thereto the fluidization gas, that is, preferably, nitrogen.

For this purpose, the method of converting a circulating fluidized bed reactor as described above, to permit it's the circulating fluidized bed reactor's operation with oxygen and recycled carbon dioxide, comprises the following conversion steps:

effecting a sealed closure of the vertical partition wall 10 of the reaction chamber 1 to form two independent subchambers, one 1B, referred to herein as the combustion subchamber, having a cross-section of between 35 and 40% of the cross-section of the reaction chamber 1, which is designed to function as a combustion chamber that is supplied with oxygen and recycled carbon dioxide, and the other subchamber 1A, referred to herein as the cooling subchamber, which is designed to be operative to effect the cooling of the fluidization gases from the external beds 5A, 5B, effecting a sealed closure of the vertical partition wall 30 of the heat exchanger cage 3 to form two independent subcages 3A, 3B, disabling of the solid particle feed to the corresponding separator 2A, of the external bed 5A that is connected to the cooling subchamber 3A, such disabling can be performed by closing the solids flow control valve, which is provided to regulate the operation of the circulating fluidized bed reactor when air is being employed for combustion purposes or by dismantling said solids flow control valve and blocking off the corresponding line associated therewith, blocking off the passage between the external bed 5A and the cooling subchamber 1A, connecting in series the solid particle feed channels associated with the two existing external beds 5A, 5B, from the external bed 5B to the external bed 5A, which initially were connected to the combustion subchamber 1A;

equipping such connection of the solid particle feed channnels with a solids flow control valve, such as, for example, by utilizing for this purpose the solids flow control valve that was dismantled as described above. This solids control valve is to then be mounted at the end of the solid particle feed channel of the external bed 5B, which has a common wall with the combustion subchamber 1B, in order to thereby permit the controlled feed to be effected to the feed channel of the other external bed 5A.

If the siphon arrangement 6 with its fluidization wind boxes 6B has already been installed on the circulating fluidized bed reactor when the circulating fluidized bed reactor is operating with air before the conversion of the circulating fluidized bed reactor from air firing to oxygen and recycled carbon dioxide firing, this siphon arrangement 6 is modified in order to ensure that the outlet of the external beds 5A and 5B, there is the required separation of the solids circuit and the fluidization gas circuit of the external beds, the latter preferably being nitrogen, in the following manner:

blocking off the outlet openings 6A of the siphon arrangement in the cooling subchamber 1A, creating openings at the inlet, in the ceiling and/or one wall of the siphon arrangement 6. which is installed in the cooling subchamber 1A, effecting the fluidization of the siphon arrangement 6 to produce a longitudinal transfer of the solids in the siphon arrangement 6 in the direction extending from the external bed 5B adjacent to the cooling subchamber 1A to the external bed 5A adjacent to the combustion subchamber 1B, with this fluidization being accomplished through the use of recycled carbon dioxide and/or steam.

If the siphon arrangement 6 has not been installed in the circulating fluidized bed reactor when the circulating fluidized bed reactor is operating with air before the conversion thereof to oxygen and recycled carbon dioxide firing, a siphon arrangement 6 with its fluidization wind boxes 6B, having the characteristics to which reference has been had hereinbefore, that is, having outlet openings for solids and outlet openings for gases, will need to be installed in the reaction chamber 1.

In the case in which the wind box 4 has not already been provided with a partition wall, the wall 40 will need to be so mounted. Only the sub-wind box 4B, which is located under the subchamber 1B, is used in this connection and when so used is fluidized with oxygen and/or recycled carbon dioxide.

A device for intermittent extraction of any material deposits may be provided, without departing from the essence of the present invention, in the bottom of the other sub-wind box 4A, which is located under the cooling subchamber 1A. Such an extraction device may also be provided, without departing from the essence of the present invention, in the bottom of the cooling subchamber 1A and close to the siphon arrangement 6 at the outlet of the separator 2A, such as to be designed to be traversed by the fluidization gases from the external beds 5A and 5B.

The conversion method in accordance with the present invention also comprises the blocking off of all the fuel and secondary combustion air feeds of the cooling subchamber 1A, whether these feeds are located in the reaction chamber 1 or in the siphon arrangement 6. The secondary combustion air feeds of the combustion subchamber 1B are equipped with oxygen-rich mixture injection rods.

Additional vaporization and/or superheat exchangers, of about 10 to 20% capacity, are installed in the free space of the external beds 5A, 5B. After conversion to oxygen and recycled carbon dioxide firing and during such operation with an oxygen-rich mixture, such vaporization and/or superheat exchangers are intended to function to replace the internal heat exchanger area of the cooling subchamber 1A which is no longer used. Such vaporization and/or superheat exchangers are made to discharge into the shield circuits in order to thereby avoid the need for a circulating pump.

Downstream of the heat exchanger cage 3, the initial flue gas circuit is used to process the gases that are discharged from the external beds 5A and 5B. A separate circuit is added after conversion to oxygen and recycled carbon dioxide firing in order to thereby process the flue gases containing carbon dioxide and steam that originate from the oxygen-rich fuel combustion circuit. This added separate circuit consists of ducts, gas-gas heat exchangers, filtration devices, fans and condensers that are designed to be operative to function as a carbon dioxide processing train before the compression of the carbon dioxide for transport purposes.

In the second embodiment as described hereinafter and as illustrated in FIGS. 9 to 12 of the Drawings, the circulating fluidized bed reactor is of a similar type as that described in patent document WO 2004/036118 filed by the same Assignee as the present patent application.

According to this prior document wherein a modular system is employed, a circulating fluidized bed reactor may comprise a reaction chamber horizontally bounded by vertical walls, n centrifugal separators that are provided with flue gas outlet ducts connecting each pair of such separators to a rear heat exchanger cage and an exchanger cage located behind the reaction chamber 1, and with the reaction chamber 1 having each of it's the reaction chamber's vertical or side walls positioned so as to be common with a vertical or side wall of a set of n/2 separators.

The embodiment, which is specifically described in accordance with the preferred version thereof, is the embodiment wherein for such separators, n=4, but the present invention, without departing from the essence thereof, applies equally to the general case wherein for such separators, n is greater than or equal to 2.

Figure 9:
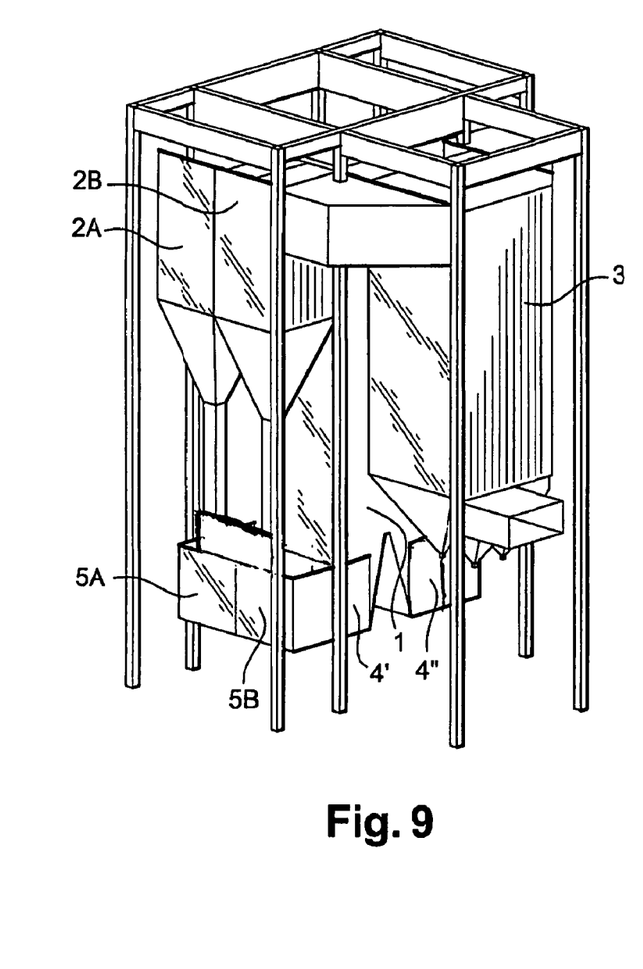
FIG. 9 is a perspective view of a second embodiment of a circulating fluidized bed reactor constructed in accordance with the present invention.

This modular circulating fluidized bed reactor in accordance with the present invention comprises a reaction chamber 1, which is horizontally bounded by vertical walls, two to six separators depending on the size of the circulating fluidized bed reactor, the embodiment of the present invention, which is being described here has four centrifugal separators 2A to 2D, and a heat recovery element, referred to herin as a heat exchanger cage 3 that is located behind the reaction chamber 1. This circulating fluidized bed reactor further includes means for introducing a fluidization gas into the reaction chamber 1 and for maintaining a circulating fluidized bed of particles in this reaction chamber 1. This circulating fluidized bed reactor also includes means for transferring the gas that must be dedusted from the reactor chamber 1 to the separators 2, means for discharging the particles separated from the separators 2, and means for transferring the dust-free gases from the separators 2 to the heat exchanger cage 3. This circulating fluidized bed reactor may also include, without departing from the essence of the present invention, two to six beds, with the specific embodiment that is being described here having four external beds 5A to 5D, each of which is designed to receive particles leaving each of a corresponding separator via a solid particle feed channel, and each possibly having a common wall with the reaction chamber 1.

Each of the vertical walls or side walls of the reaction chamber 1 may be common with a vertical or side wall of a pair of separators.

According to the present invention, such a circulating fluidized bed reactor, which is designed to be supplied with air for combustion purposes is capable of being converted so as to be able to be made to operate when firing an oxygen-rich mixture, in an efficient manner and with a minimum number of conversion operations being required in order to accomplish this result.

Preferably, such a oxygen-rich mixture consists of 70% oxygen and 30% recycled carbon dioxide.

Figure 10:
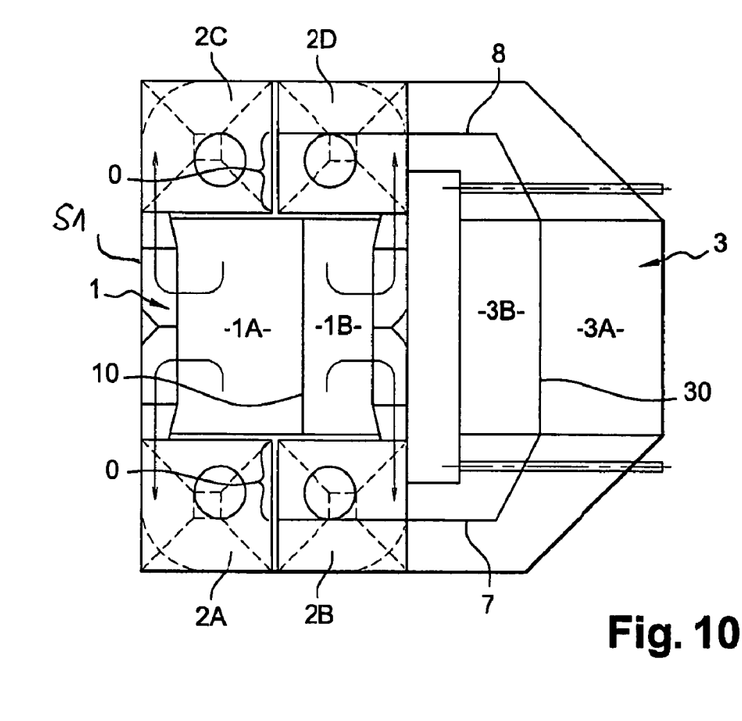
FIG. 10 is a horizontal cross-section of the upper portion of a second embodiment of a circulating fluidized bed reactor constructed in accordance with the present invention.
Figure 11A:
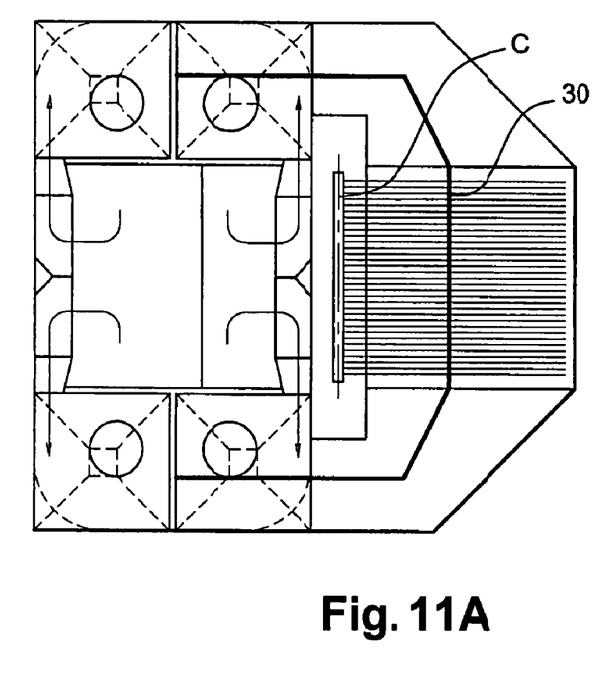
FIGS. 11A to 11C are horizontal cross-sections of the upper portion of a second embodiment of a circulating fluidized bed reactor constructed in accordance with the present invention.
Figure 11B:
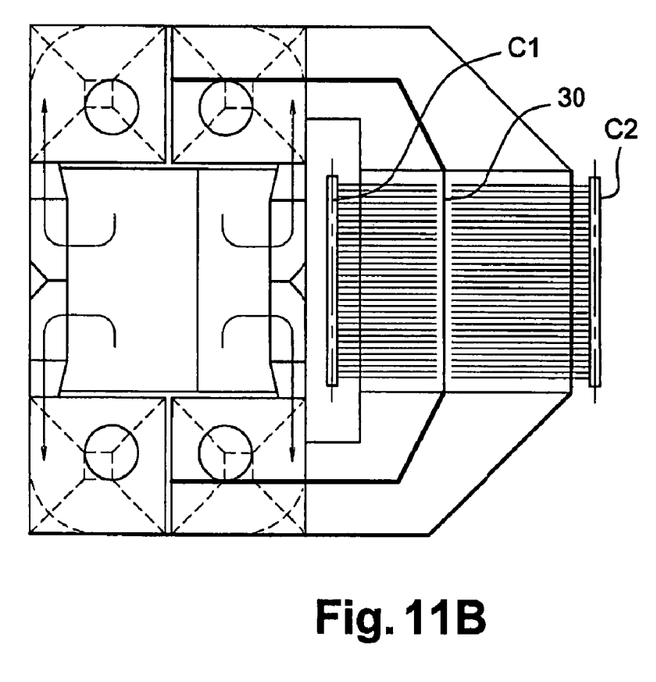
Figure 11C:
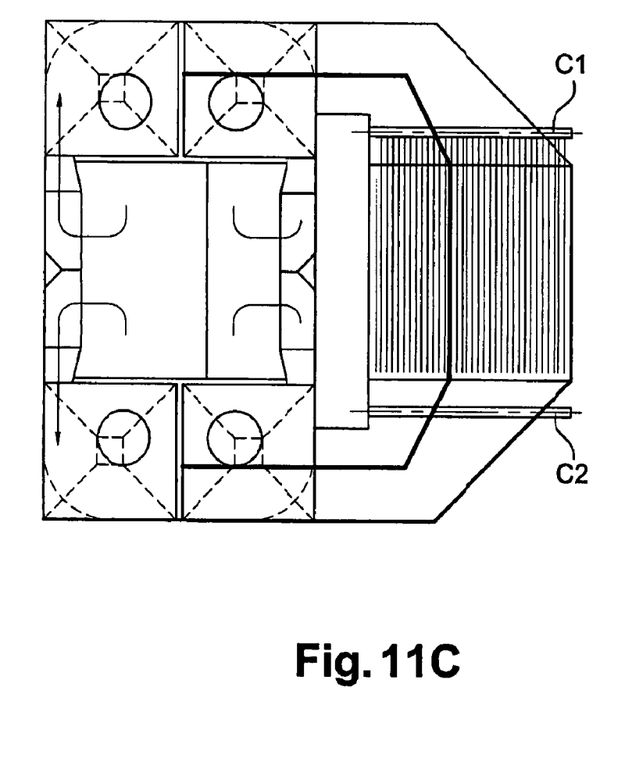

Continuing, as illustrated in FIGS. 10 and 11 of the Drawings, the reaction chamber 1 includes at least one partial internal vertical partition wall 10 that is operative to form two subchambers 1A and 1B, which communicate with one another, and which also each communicate with side separators. The heat exchanger cage 3 includes a partial internal vertical partition wall 30 that is operative to form two subcages 3A, 3B, which communicate with each other, and which also each communicate with the separators.

The partition wall 10 of the reaction chamber extends parallel to the front wall S1 of the reaction chamber 1, while the partition wall 30 of the heat exchanger cage e extends parallel to the partition wall 10 of the reaction chamber 1.

In general, the partition walls 10, 30 are so arranged such as to thereby define a cross-section of the subchamber 1B, and one of the subcages, that is, subcage 3B when the mode of operation involves oxygen being supplied to the reaction chamber 1.

Preferably, the cross-section of the sunvhamber 1A is between 60 and 65% of the total cross-section of the reaction chamber 1, while the cross-section of the subchamber 1B is between 35 and 40%. Also, preferably the cross-section of the subcahe 3A is between 60 and 65% of the total cross-section of the heat exchanger cage 3, while the cross-section of the subcage 3B is between 35 and 40%.

The partition walls 10, 30, as shown in the Figures of the Drawings, extend from the ceiling to the bottom of the reaction chamber 1 and heat exchanger bed 3, respectively, so as to thereby provide a free passage in the bottom of the reaction chamber 1 and/or of the heat exchanger cage 3. As a variant thereto, the partition walls 10, 30 may also be made to provide a free passage in the upper portion of the reaction chamber 1 and of the heat exchanger cage 3 or the partition walls 10, 30 may take the form of walls wherein several openings, are or are not distributed along their height and are or are not arranged along their entire width.

In the heat exchanger cage 3, the exchangers may be arranged so as to extend perpendicular to the front wall S1 of the reaction chamber 1 and may be made to pass through the partition wall 30 of the heat exchanger cage 3 in a sealed manner, as illustrated in FIG. 11A of the Drawings. In such a case, a single row of collectors C is then necessary, and such collectors C can be arranged on either the front edge of or behind the heat exchanger cage 3.

The exchangers may also be arranged so as to extend perpendicular to the front wall of the reaction chamber 1 and not be made to pass through the partition wall 30 of the heat exchanger cage 3 in a sealed manner, as illustrated in FIG. 11B of the Drawings. In such a case, two rows of collectors C1 and C2 are then necessary, with such collectors C being arranged on the front and back edges of the heat exchanger cage 3.

The exchangers may also be arranged so as to extend parallel to the front wall S1 of the reaction chamber 1 such that the exchangers do not pass through the partition wall 30 of the heat exchanger cage 3, as illustrated in FIG. 11C of the Drawings. In such a case, two rows of collectors C1, C2 are then necessary, with each being arranged on one side edge of the heat exchanger cage 3.

According to this embodiment of the present invention, the lower portion of the reaction chamber 1 may be of the type wherein an internal wall is formed in an upside-down V and comprises two fluidization hearths and two parallel wind boxes 4' and 4", that are clearly visible in FIG. 9 of the Drawings.

Each of the boxes 4' and 4" in turn is divided into two sub-boxes by a wall that is located in the same vertical plane as the partition wall 10 of the reaction chamber 1.

As a variant thereto, it may suffice for the wind boxes 4' and 4" to be pre-equipped so as to be capable of subsequently being segmented when the circulating fluidized bed reactor is being converted from air firing to oxygen and recycled carbon dioxide firing.

Figure 12:
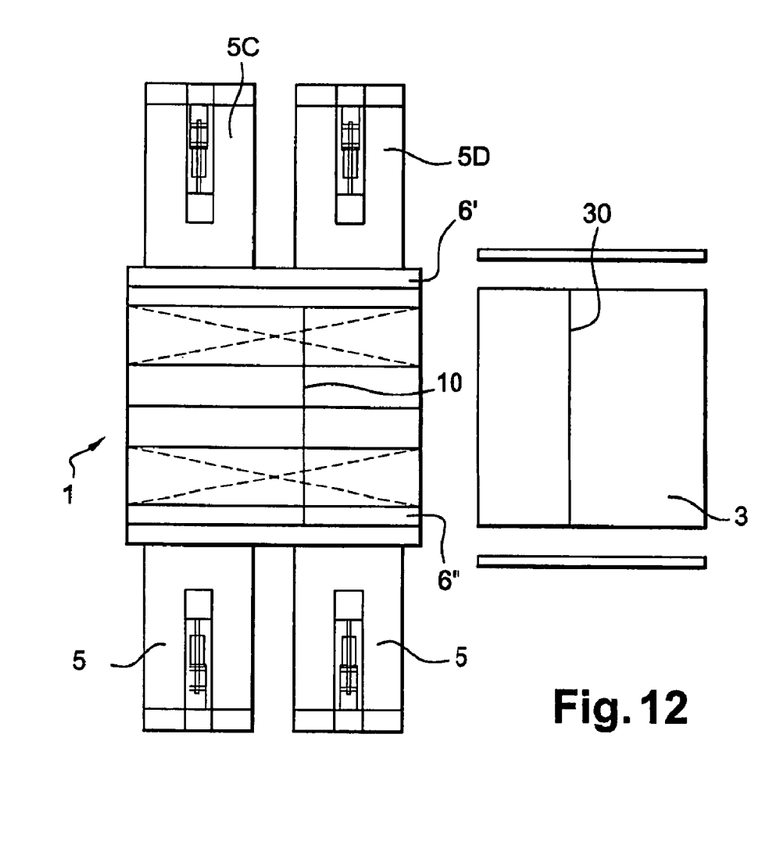
FIG. 12 is a cross-section of the bottom portion of a second embodiment of a circulating fluidized bed reactor constructed in accordance with the present invention.

As shown in FIG. 12 of the Drawings, two lateral siphon arrangements 6' and 6" may be arranged fully or partially in the reaction chamber 1 on the length of the wall closest to the external beds 5A to 5D or possibly can be made to be common with the lateral external beds 5A to 5D of the reaction chamber 1. Prior to conversion, that is, when being operated with air firing, the siphon arrangements 6' and 6" do not perform any specific function other than to ensure the passage of the solids from the external beds 5A to 5D to the reaction chamber 1 via outlet openings suitably arranged for this purpose along the entire length of the reaction chamber 1. The siphon arrangements 6' and 6" can be installed upon the assembly of the circulatimg fluidized bed reactor in order to thereby decrease and simplify the modifications required during the conversion of the circulating fluidized bed reactor from air firing to oxygen and recycled carbon dioxide firing.

As a variant thereto, such siphon arrangements 6' and 6" may be equally well installed subsequently during the conversion of the circulating fluidized bed reactor from air firing to oxygen and recycled carbon dioxide firing.

The open areas of the external beds 5A to 5D are oversized in their length in order to thereby provide a free space. As described hereinafter, vaporization and/or superheat exchangers will in fact have to be added in these external beds 5A to 5D in order to allow for the operation with oxygen and with recycled carbon dioxide.

As illustrated in FIG. 10 of the Drawings, the two upper flue gas outlet ducts connecting each pair of separators 2A, 2B and 2C, 2D to the back exchanger cage are equipped with a vertical and partial partition wall 7, 8 of which their back edge is in the same plane as that of the partition wall 30 of the heat exchanger cage 3.

Furthermore, the fuel feed lines are oversized in order to thereby permit the full passage of the fuel after conversion in the combustion subchamber 1B. The same applies to the fuel transport apparatus which must permit a total injected flow rate after conversion in the combustion subchamber 1B.

A reactor as previously described is designed to operate with air. Thanks to a number of changes which are now described, it can be converted so as to operate within an oxygen-rich mixture. The general principle of this conversion is to use a single subchamber of the reaction chamber as a firebox or combustion subchamber, to use the two separators connected to it in their primary gas and solids separation function, to recover the gases leaving these separators in a subcage of the exchanger cage, to recover the solids leaving these separators in the two corresponding external beds connected to the other external beds to be traversed in parallel by the solids each with its adjacent bed and connected at the outlet of said combustion chamber for transferring the solids thereto and connected at the outlet of the other subchamber, called the cooling subchamber, for transferring thereto the fluidization gas, that is preferably nitrogen.

For this purpose, the method for converting a circulating fluidized bed reactor as described above, in order to permit its operation with oxygen and recycle carbon dioxide, comprises the following conversion steps:

complete and sealed closure of the vertical partition wall 10 of the reaction chamber to form two independent sub-chambers, one 1B, called the combustion subchamber, with a cross section of between 35 and 40%, designed to form a combustion chamber fed with oxygen and recycled carbon dioxide, and the other 1A, called the cooling subchamber, designed to cool the fluidization gases of the external beds 5A, 5B, 5C, 5D, complete and sealed closure of the vertical partition wall 30 of the cage to form two independent subcages 3A, 3B, disabling of the solid particle feed by the two corresponding separators 2A and 2C, of the two external beds 5A and 5C connected to the cooling subchamber 1A, this disabling performed by closure of the valve provided to control the reactor in operation with air or by dismantling this valve and blocking the corresponding line, blocking of the passage between these two external beds 5A and 5C and of the cooling subchamber 1A, on each side of the chamber, connection in series of the solid particle feed channels of all the existing beds from the external bed connected to the combustion subchamber 1B; a valve, for example, the one dismantled above, is then mounted at the outlet of the feed channel of each external bed having a common wall with the combustion subchamber 1B, to permit controlled feed of the other bed of each pair, the two adjacent beds thereby being traversed in parallel by the solids, equipping of this connection with a solids flow control valve.

If the two siphon arrangements 6' and 6" have already been installed on the reactor before conversion, these siphon arrangements are modified by the following operations, in order to ensure at the outlet of the external beds, the separation of the solids circuit and the fluidization gas circuit of the external beds, that is preferably nitrogen:

blocking of the outlet openings of each siphon arrangement 6', 6" in the cooling subchamber 1A, making of openings at the inlet, in the ceiling and/or one wall of each siphon arrangement 6', 6" in the cooling subchamber 1A, fluidization of each siphon arrangement 6' 6" to produce a longitudinal transfer of the solids in these arrangements, in the direction going from the beds 5A, 5C adjacent to the cooling subchamber to the beds 5B, 5D adjacent to the combustion subchamber; this fluidization being performed by recycled carbon dioxide and/or steam.

If the siphon arrangement has not been installed on the reactor operating with air before conversion, a siphon arrangement with its wind boxes having the above characteristics, that is outlet openings for solids and outlet openings for gases according to the subchamber, is installed in the reaction chamber.

If the two wind boxes 4' and 4" have not already been equipped with a partition wall, this wall is mounted. Only the two sub-boxes located under the combustion subchamber 1B are used and fluidized with oxygen and recycled carbon dioxide.

The partition walls 7, 8 of the flue ducts are blocked at their end O in the cyclones so that the sub-lines supplying the subcage 3B may retain part of the flue gases leaving the back cyclones 2B, 2D.

A device for intermittent extraction of any deposits can be provided in the bottom of the cooling subchamber 1A and the other sub-boxes located under the cooling subchamber 1A. Such an extraction device may also be provided close to the siphon arrangement at the outlet of the separators 2A and 2C designed to be traversed by the fluidization gases of the external beds.

The conversion method also comprises the blocking of all the fuel and secondary combustion air feeds of the cooling subchamber 1A, whether these feeds are located in the reaction chamber or in the siphon arrangement. The secondary combustion air feeds of the combustion subchamber 1B are equipped with oxygen-rich mixture injection rods.

Additional vaporization. and/or superheat exchangers, of about 10 to 20%, are installed in the free space of the external beds 5A, 5B, 5C, 5D. After conversion and during operation with an oxygen-rich mixture, these exchangers replace the internal heat exchange area of cooling subchamber 1A which is no longer used. These exchangers can discharge into the shield circuits to avoid the need for a circulating pump.

Downstream of the exchanger cage 3, the initial flue gas circuit is used to process the gases discharged from the external beds. A separate circuit is added to process the flue gases containing carbon dioxide and steam and originating from the oxygen-rich fuel combustion circuit. This added circuit comprises ducts, gas-gas heat exchangers, filtration devices, fans and condensers toward a carbon dioxide processing train before compression for transport.

While several embodiments and variations of the present invention have been shown it will be appreciated that modification thereof, some of which have been alluded to hereinabove, may still be readily made thereto by those skilled in the art. It is, therefore, intended that the appended claims shall cover the modifications alluded to herein as well as all the other modifications that fall within the true spirit and scope of the present invention.

What is claimed is:

1. A circulating fluidized bed reactor comprising:
a reaction chamber having a vertical partition wall forming two independent subchambers that include a combustion subchamber and a cooling subchamber, wherein combustion fluidizing gas is provided to the combustion subchamber to maintain a circulating fluidized bed therein;
at least one centrifugal separator that receives flue gas from the combustion subchamber and separates particles from the flue gas;
at least one external bed that receives the particles from the at least one centrifugal separator and provides the particles to the combustion subchamber, wherein external bed fluidizing gas is provided to the external bed to fluidize the particles therein, wherein the cooling subchamber cools the external bed fluidizing gas received from the external bed; and
a heat exchanger cage that receives the flue gas from the centrifugal separator and the external bed fluidizing gas from the cooling subchamber.

2. The circulating fluidized bed reactor as claimed in claim 1 wherein the cross-section of one of said subchambers is between 60 and 65% of the total cross-section of said reaction chamber, the cross-section of the other subchamber is between 35 and 40%.

3. The circulating fluidized bed reactor as claimed in claim 1 further includes a wind box that is divided into two sub-boxes by a wall located in the same plane as the partition wall of said reaction chamber.

4. The circulating fluidized bed reactor as claimed in claim 1 wherein open areas of said external bed are sized in order to provide a free space for adding additional heat exchanger.

5. The circulating fluidized bed reactor as claimed in claim 1 wherein said reaction chamber includes vertical walls, and the partition wall of said reaction chamber extends perpendicular to a front wall of said reaction chamber.

6. The circulating fluidized bed reactor as claimed in claim 1 wherein said reaction chamber includes vertical walls, and the partition wall of said reaction chamber extends parallel to a front wall of said reaction chamber.

7. The circulating fluidized bed reactor as claimed in claim 1 wherein the heat exchanger cage includes a partition wall forming two independent subcages.

8. The circulating fluidized bed reactor as claimed in claim 7 wherein the cross-section of one of the subcages is between 60 and 65% of the total cross-section of the heat exchanger cage, and the cross-section of the other subcage is between 35-40% of the total cross-section of the heat exchanger cage.

9. The circulating fluidized bed reactor as claimed in claim 7 wherein the partition wall of the reaction chamber and the partition wall of the heat exchanger cage are parallel to each other.

10. The circulating fluidized bed reactor as claimed in claim 7 wherein the flue gas from the separator is provided to one of the subcages, and the external bed fluidizing gas from the cooling subchamber is provided to the other subcage.

11. The circulating fluidized bed reactor as claimed in claim 10 wherein the cross section of the subcage receiving the external bed fluidizing gas from the cooling subchamber is greater than the cross-section of the subcage receiving flue gas from the separator.

12. The circulating fluidized bed reactor as claimed in claim 7 wherein the partition wall of the reaction chamber and the partition wall of the heat exchanger cage are aligned with each other.

13. The circulating fluidized bed reactor as claimed in claim 1 wherein the cross-section of the cooling subchamber is greater than the cross-section of the combustion subchamber.

14. The circulating fluidized bed reactor as claimed in claim 1 wherein an oxygen-rich mixture is provided to the combustion subchamber.

15. The circulating fluidized bed reactor as claimed in claim 14 wherein the oxygen-rich mixture is 70% oxygen and 30% recycled carbon dioxide.

* * * * *